Patented June 27, 1939

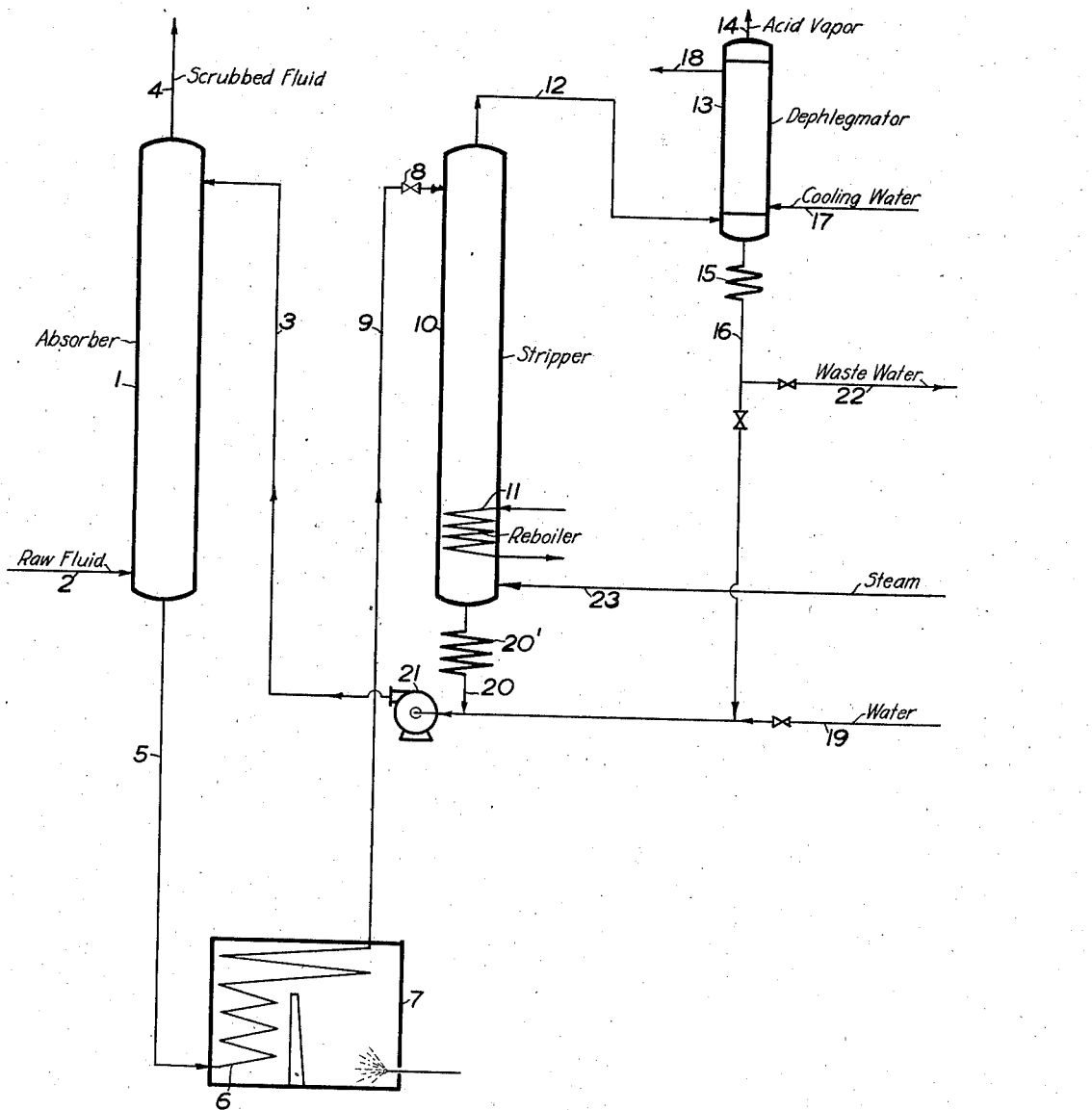

2,164,194

UNITED STATES PATENT OFFICE 2,164,194

PURIFICATION AND SEPARATION OF GASEOUS MIXTURES

Russell W. Millar, Berkeley, and Russel L. Maycock, San Francisco, Calif., assignors to Shell Development Company, San Francisco, Calif., a corporation of Delaware Application August 14, 1937, Serial No. 159,026

7 Claims. (Cl. 23—2)

This invention relates to the purification of gases and hydrophobe liquids containing vaporizable weakly acidic components such as $H_2S$, $CO_2$, HCN, mercaptans, phenols, etc., and especially deals with the purification of normally gaseous hydrocarbons containing harmful quantities of $H_2S$.

A number of processes have been proposed and employed for the separation of $H_2S$ and analogous vaporizable weak acids from gases or hydrophobe liquids, which processes involve the continuous circulation of an alkaline reacting liquid absorption medium through an absorption stage in which the fluid is scrubbed and $H_2S$ is absorbed in the alkaline liquid, and through a reactivation or stripping stage in which the absorbed $H_2S$ is removed, wherein the absorption medium is regenerated and rendered suitable for further scrubbing.

It is a purpose of this invention to provide a novel method for improving the absorption and regeneration efficiencies. Another purpose is to facilitate the regeneration in a manner so that the work required to reduce the acid gas content of the spent solution upon regeneration to a predetermined point is minimized.

Fluids treated by processes of the type described comprise natural gas, petroleum refinery gases, coke oven gas, generator gas and other manufactured gases, as well as the gases generated in the various industries such as ore smelting; or air containing weakly acidic gases, especially hydrogen sulfide or $CO_2$; or organic liquids which are substantially immiscible with water as propane, butane, pentane, hexane fractions, benzene, natural gasoline, low boiling gasoline fractions, gasoline distillates, kerosene distillates, normally liquid chlorinated hydrocarbons for instance carbon tetrachloride, ethylene dichloride, etc., fatty and essential oils, and other hydrocarbon and nonhydrocarbon chemically neutral fluids.

For the absorption of the weakly acidic components, aqueous solutions of certain organic hydroxy amino bases or salts of inorganic strong bases and relatively weak acids of low volatility are usually employed. A suitable absorption medium absorbs the weak acid from the fluid quickly and completely and is capable of being regenerated by convection activation, i. e., it permits substantial removal of the weak acids by simple distillation or by a reversal of the absorption reaction in a simple manner, by passing an inert gas therethrough, preferably at an elevated temperature, as by boiling, steaming, and/or at a reduced pressure. Among the absorption media capable of regeneration by convection which have been used in the past for removing $H_2S$ or HCN, are aqueous solutions of the following alkaline reacting compounds: tripotassium phosphate, sodium carbonate, sodium phenolate, sodiumborate, sodium arsenite, mono-, di-, and triethanol amine or mixtures thereof, diaminoisopropanol, etc. Mercaptans are generally removed with aqueous solutions of alkali metal hydroxides.

When herein speaking of absorbents we specifically mean alkaline compounds of the above type which are capable of absorbing weak acids and releasing them upon heating and/or under reduced pressure in contact with a vaporous convection medium such as steam, air, nitrogen, hydrogen, hydrocarbon vapors, etc. The terms fat, foul or spent solution as herein used designate an absorbent solution which contains sufficient weak acid so that the solution must be regenerated before it can be used economically for further scrubbing of fluids; and the term lean solution indicates a regenerated alkaline solution suitable for further scrubbing.

It is known that the amount of weak acid which can be absorbed per volume unit of an absorbent solution from a fluid containing same to reduce its acid content to a desired level, increases with the concentration of the absorbent in the solution. Therefore it has been the general practice to employ solutions of suitable absorbents which are as nearly saturated as can be handled safely at the lowest temperatures occurring in the absorption and regeneratiton systems, without danger of causing operating difficulties such as improper contact between fluid and absorbent solution, because of insufficient volume of the latter, or precipitation of a portion of the salt, if the absorbent is a salt, which would lead to clogging of the apparatus.

The data in Table I illustrate the effect of concentration of $K_3PO_4$ on the amount of $H_2S$ which can be absorbed to produce solutions having certain $H_2S$ pressures at 150° F.

TABLE I

| Mols $K_3PO_4$ per kg. solution | Lbs. $H_2S$ absorbed per gallon solution, mm. $H_2S$ equilibrium press. in vap. space | | |
|---|---|---|---|
| | 1 | 5 | 10 |
| 1.485 | .28 | .40 | .45 |
| 1.95 | .37 | .54 | .61 |

From the fact that absorbent solutions of relatively high concentration are capable of absorbing larger quantities of weak acid per volume unit than more dilute solutions, it was concluded that relatively concentrated solutions are better absorbents, capable of reducing the acid content of the fluid to a lower figure, and conversely that the absorbed acid gas from a spent solution is more easily expelled from a relatively dilute absorbent solution. In consequence it is the general practice to strip the foul absorbent solution in as dilute a state as possible by returning at least a portion of the water vaporized during the stripping to the stripping zone in the form of reflux.

Now we have discovered that it is more economical to carry out the stripping of the foul solution in as concentrated a state as is practical.

Contrary to expectations and former assumptions the partial pressure of $H_2S$ or similar weak acids increases with a rise in the concentration of the absorbent for constant ratios of the weak acid to absorbent in the solution, as long as the absorbent solution forms but a single layer.

The significance of this pressure-concentration relation is that a given amount of spent absorbent in a relatively concentrated solution can be stripped to a certain predetermined maximum weak acid content with the expenditure of less work than would be required if the same amount of spent absorbent were in a more dilute solution.

The data in Table II below, which are typical, show the change of $H_2S$ pressure with variations in the concentration of the absorbent $K_3PO_4$ at a constant ratio of absorbent to $H_2S$ in the solution at a temperature of 150° F.

TABLE II

*Mol ratio of $H_2S$ to $K_3PO_4 = .85$*

| Mols $K_3PO_4$ per kg. solution | Mols $K_3PO_4$ per gal. solution | Lbs. $H_2S$ absorbed per gal. | $H_2S$ equilibrium press. in vapor space mm. Hg |
|---|---|---|---|
| 1.0 | 4.63 | .296 | 8.7 |
| 1.5 | 7.70 | .491 | 16.6 |
| 2.0 | 11.40 | .728 | 31.6 |
| 2.5 | 15.77 | 1.007 | 60.3 |

Similar relations of $H_2S$ pressures to concentrations at constant $H_2S$ to absorbent ratios hold, for instance, for diaminoisopropanol as shown in Table III.

TABLE III

| Mol ratio $H_2S$ to DAP [1] equivalent | Pressure of $H_2S$ mm.Hg at 150° F. | |
|---|---|---|
| | 15% DAP [1] in solution | 30% DAP [1] in solution |
| .328 | 90 | 124 |
| .197 | 23 | 33 |
| .103 | 5 | 8 |

[1] DAP = diaminoisopropanol; 1 equivalent = ½ mol DAP.

As pointed out before, an exception to the above pressure-concentration rule may be found in cases where the absorbent or a portion thereof is precipitated to form a separate phase or layer. Such a condition may be encountered in the case of sodium phenolate. There it has been found that within the region of a single phase the rule applies in accordance with the findings described hereinbefore. But in the region where the spent absorbent solution separates into two or more layers of solution and absorbent, the opposite may be true.

The usefulness of our invention is therefore greatest with absorbent solutions which under the conditions of the stripping form but a single layer.

Our invention consists essentially of carrying out the stripping of the spent absorbent solution under conditions to effect a material concentration of the absorbent in the solution during this operation. None of the water vaporized is returned to the stripping zone, so that the solution reaches a maximum concentration with a minimum amount of work required to vaporize water. Instead, all of the water required to maintain the material balance in the cycle of scrubbing and stripping, is returned to the absorbent solution after completed regeneration and prior or during the scrubbing of the fluid.

Referring to the attached drawing, a raw fluid of the type hereinbefore described containing an acidic gas such as $H_2S$ enters a conventional scrubber 1 through line 2 from a source not shown. The fluid travels in an upward direction through the scrubber in countercurrent to an absorbent solution such as an aqueous solution of $K_3PO_4$ or equivalent alkaline absorbent, which is admitted through line 3 near the top of the scrubber 1. Scrubbed fluid is withdrawn through top line 4. Spent absorbent solution flows through bottom line 5, heating coil 6 in furnace 7 and expansion valve 8 in line 9 into the plate stripper 10, which is of conventional design. Normally the pressure in the scrubber is sufficient so that the solution will flow to the stripper without being pumped. Coil 6, instead of being fired directly, may be heated indirectly with steam or by any other suitable means.

The amount of heat introduced into the solution in coil 6 may be sufficient to flash a material portion of the water of solution in the top of the stripper, or it may merely serve to preheat for the purpose of reducing the load on the reboiler 11 located in the bottom of the stripper 10.

Water vapor together with liberated acid gas are removed through vapor line 12 and are fractionated in dephlegmator 13 equipped with conventional cooling means not shown, and inlet and outlet pipes 17 and 18, respectively, for cooling water. Acid gas is expelled through top line 14 and water substantially free from acid gas passes through cooler 15 in line 16. The cooled water or an equal amount of fresh water from line 19 is used to dilute the regenerated concentrated absorbent solution which is discharged from stripper 10 through cooler 20' in line 20. The diluted solution is then conveyed by pump 21 in line 3 to the top of scrubber 1.

If fresh water is used for dilution instead of condensed water the latter is discarded through line 22.

Since removal of the acid gas is facilitated by concentrating the solution, it is normally advantageous to effect at least part of the concentrating at the top of the stripper 10, so that the beneficial effect of increased concentration is available during the entire stripping period. In this case steam from an outside source may be introduced at the bottom of the stripper through line 23. Water of condensation in excess of that required to maintain the material balance in the scrubbing stripping cycle is discarded through line 22. Instead of steam, other suitable convection vapor or gas as hydrocarbons, etc., may be used.

While in the foregoing we have described a preferred simplified arrangement of equipment it shall be understood that known equivalents may be used instead, and that additional heat exchangers, coolers, valves, by-pass lines and other equipment may be incorporated at one or several points, to enable exercise of greatest heat economy and the control of the most favorable temperatures. The installation of such devices is considered within the skill of the ordinary plant designer acquainted with their operation. For instance, instead of using a plate stripper 10 we may use one or several ordinary boilers, in which case the heating coil 6 may be deleted altogether. The dephlegmator 13 may be replaced by a combination of a condenser, a trap to separate acid vapors from the water, and a stripper to expel residual acid from the water, vapors from the stripper returning to the condenser. Again, if vaporizable acids boil near or above the boiling temperature of water, as in the case of mercaptans, a settler may be used to separate liquid mercaptans from the condensed water.

The advantages which result from our mode of operation as compared with the conventional type of stripping using reflux, are well illustrated in the following examples, results of which are tabulated in Table IV.

A raw hydrocarbon gas containing 2.0% $H_2S$ was scrubbed at 150° F. at a pressure of 10 atm. with tripotassium phosphate containing 1.485 mols $K_3PO_4$ per kg. solution. The fat solution was stripped in a 15-plate stripper having a reboiler at the bottom. In the conventional type of operation water of condensation was returned to the top of the stripper as reflux, and in our method no reflux was used, all of the water of condensation being returned to the solution after completed stripping. The following operation data and results were obtained:

TABLE IV

*Stripping operation*

| | Concentration of solution, mols $K_3PO_4$ per kg. | |
|---|---|---|
| | Without reflux | With reflux |
| Entering stripper | 1.485 | 1.485 |
| Above reboiler | 1.485 | 1.000 |
| In reboiler | 1.95 | 1.485 |

STEAM CONSUMPTION IN STRIPPER

| | | |
|---|---|---|
| Lbs. steam per lb. $H_2S$ | 13.9 | 20.8 |

*Scrubbing operation*

| | | |
|---|---|---|
| Gal. solution per 1000 cu. ft. gas | 103 | 112 |
| Percent $H_2S$ in scrubbed gas | .036 | .045 |

It is evident from these data that a substantial saving in steam is effected by our method of stripping the fat solutions.

We claim as our invention:

1. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, regenerating the latter by contact with a stripping medium to drive off absorbed impurities and recirculating the regenerated solution for further scrubbing the fluid, the improvement comprising heating said fat absorbent solution to vaporize a portion of the water of solution, thereby increasing the concentration of the absorbent in the solution, thereafter contacting the resultant solution of increased absorbent concentration with stripping steam in a stripping zone under conditions substantially to maintain said increased concentration whereby a concentrated stripped solution is obtained, withdrawing the stripped solution from said zone and adding to the withdrawn solution an amount of water substantially equal to that vaporized.

2. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, regenerating the latter by contact with a stripping medium to drive off absorbed impurities and recirculating the regenerated solution for further scrubbing the fluid, the improvement comprising heating and flash vaporizing said fat absorbent solution under conditions to vaporize a portion only of the water of solution, thereby increasing the concentration of the absorbent in the solution, flowing the resulting solution of increased absorbent concentration in countercurrent to stripping steam in a stripping zone under conditions substantially to maintain said increased concentration, whereby a concentrated stripped solution is obtained, withdrawing the stripped solution from said zone, and adding to the withdrawn solution an amount of water substantially equal to that vaporized.

3. In the process of purifying a fluid from $H_2S$ and analogous acidic impurities which comprises scrubbing the flowing fluid with an aqueous solution of an alkaline absorbent for the acidic impurities capable of activation by contact with a stripping medium, to produce a fat solution containing impurities, regenerating the latter by contact with a stripping medium to drive off absorbed impurities and recirculating the regenerated solution for further scrubbing the fluid, the improvement comprising heating said fat absorbent solution to vaporize a portion of the water of solution, thereby increasing the concentration of the absorbent in the solution, thereafter contacting the resultant solution of increased absorbent concentration with stripping steam in a stripping zone under conditions substantially to maintain said increased concentration whereby a concentrated stripped solution is obtained, withdrawing the stripped solution from said zone, reboiling the withdrawn solution in the reboiling zone to vaporize additional amounts of water and to produce at least a portion of said stripping steam, and adding to the resulting reboiled solution an amount of water substantially equal to that vaporized.

4. The process of claim 1 in which the fat absorbent solution forms but a single layer.

5. The process of claim 1 in which the absorbent solution is tripotassium phosphate.

6. The process of claim 1 in which the absorbent solution is a water soluble aliphatic hydroxy amine.

7. The process of claim 1 in which the absorbent is a solution of diaminoisopropanol.

RUSSELL W. MILLAR.
RUSSEL L. MAYCOCK.